H. B. COATS.
VACUUM TANK.
APPLICATION FILED MAY 23, 1921.
1,438,745.
Patented Dec. 12, 1922.
2 SHEETS—SHEET 1.
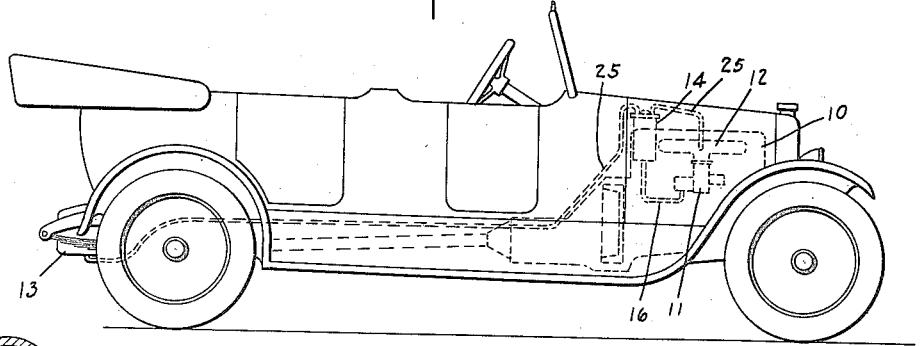
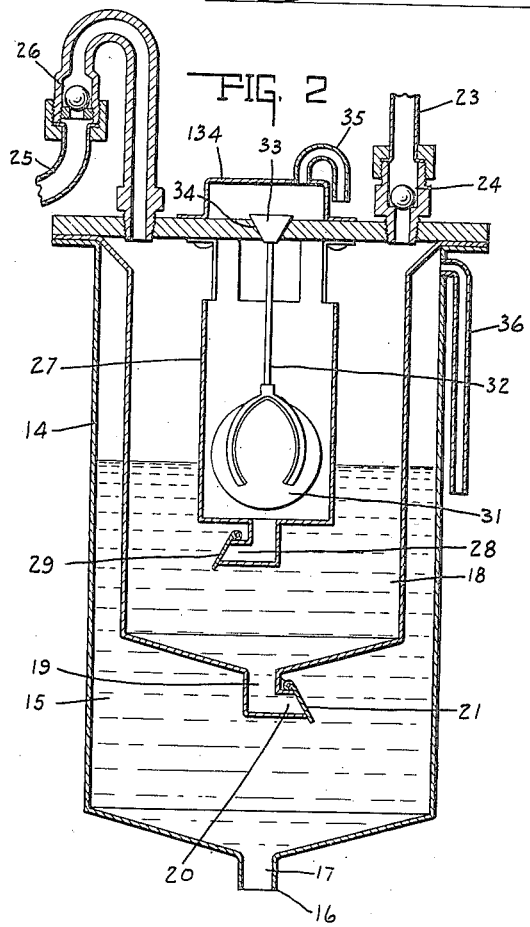
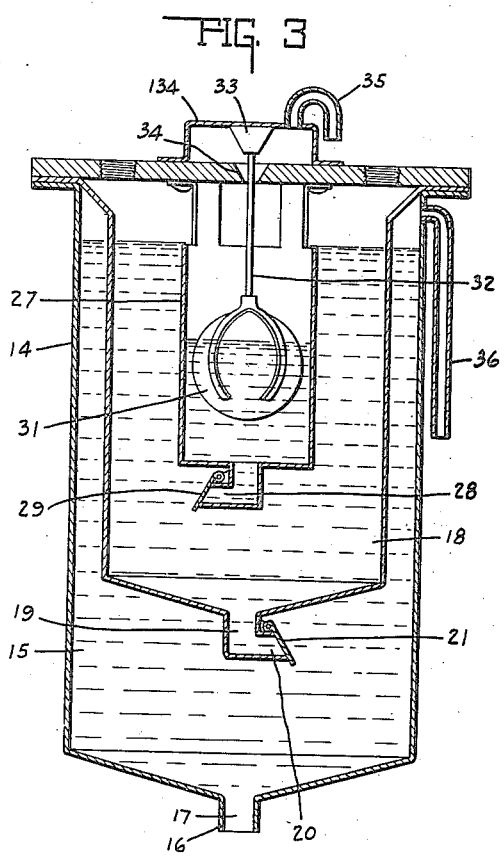
Inventor
HENRY B. COATS.
By Lockwood & Lockwood
Attorneys.

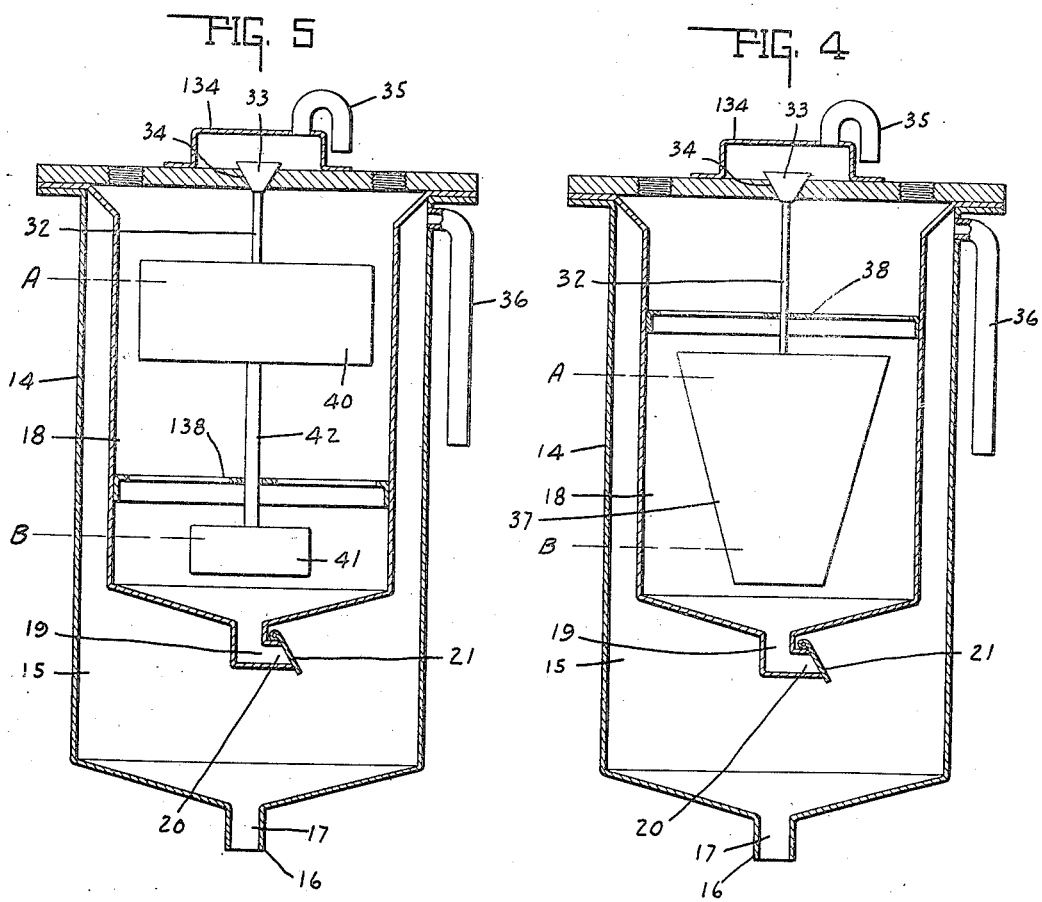

Patented Dec. 12, 1922.

1,438,745

UNITED STATES PATENT OFFICE.

HENRY B. COATS, OF VEEDERSBURG, INDIANA.

VACUUM TANK.

Application filed May 23, 1921. Serial No. 471,831.

*To all whom it may concern:*

Be it known that I, HENRY B. COATS, a citizen of the United States, and a resident of Veedersburg, county of Fountain and State of Indiana, have invented a certain new and useful Vacuum Tank; and I do hereby declare that the following is a full, clear, and exact description thereof, reference being had to the accompanying drawings, in which like numerals refer to like parts.

This invention relates to a vacuum tank for motor vehicles and the like wherein the fuel reservoir is located at a distance from the internal combustion engine to be supplied with fuel, and at a lower elevation. The purpose of the vacuum tank is to maintain an auxiliary supply of fuel to be fed to the engine by gravity, the vacuum tank to be supplied by the suction created therein from the intake of the engine.

The principal object of the invention is to simplify the construction of the known types of vacuum tanks and to eliminate as many movable parts as possible and especially the springs commonly used for controlling the valves. With applicant's construction no springs of any kind are used, and the movable parts are reduced to a minimum, for minimizing the trouble caused by the more complicated mechanism and movable parts getting out of order or breaking.

Another object of the invention is to so construct the vacuum tank as not only to be simple and cheap to manufacture, but to improve its efficiency and thereby the efficiency of the engine, the supply of fuel maintained in the tank being more completely controlled, whereby the necessary fuel supply will be at all times available for the engine regardless of the speed at which it is being driven.

The full nature of this invention will be understood from the accompanying drawings and the following description and claim.

In the drawings Fig. 1 is a side elevation of an automobile showing, by dotted and full lines, the means for supplying liquid fuel to the engine. Fig. 2 is a central vertical section of the vacuum tank control in the process of filling with the vacuum controlling valve closed. Fig. 3 is the same with the tank filled substantially to its maximum, and with the vacuum controlled valve open. Fig. 4 is a section similar to Fig. 2 showing a modified construction. Fig. 5 is a similar section showing another modified form.

In the drawings, there is shown a vehicle having a motor 10, a carburetor 11 and an intake manifold 12. At the rear of the vehicle there is positioned a fuel reservoir 13, and in close approximation thereof, and at a higher level, there is mounted a vacuum tank 14.

The vacuum tank consists of a fuel discharge chamber 15 which is intended to be constantly filled with fuel. The chamber communicates with the tube 16 through the passage 17 from the bottom thereof. The tube 16 leads directly to the carbureter for supplying fuel thereto. Suspended within the chamber 15 of said tank there is a vacuum or fuel receiving chamber 18 tapering at the bottom to an opening 19 communicating with the horizontal outlet passage 20 having an inclined end adapted to be closed by the flap valve 21. By means of this arrangement the fuel drawn into the vacuum chamber 18, by the vacuum created therein, will pass by gravity into the fuel chamber 15, forcing the valve 22 open, for maintaining the supply of fuel.

Passing through the top of the tank 14 and communicating with the vacuum chamber 18 there is a tube 23 connecting with the intake manifold 12, through which the suction of the motor draws the air from the vacuum chamber for creating the vacuum therein. Mounted in said tube there is a ball check valve 24 for permitting the suction of air therethrough to the manifold, but preventing any return passage of air from the manifold to the vacuum chamber.

The fuel line 25 leads from the bottom of the fuel reservoir 13 to the top of the vacuum tank 14, communicating with the vacuum chamber 18 into which the fuel may be drawn by the vacuum created therein. The fuel line 25 is provided with a ball check valve 26 for preventing the fuel, which may be raised to the highest level in said pipe line, from returning by gravity to the reservoir, whereby the vacuum tank will not have to draw the fuel into the fuel line each time the engine is started up after being at rest.

Suspended within the vacuum chamber 18 there is a float chamber 27 open at the top and having the top of its walls positioned at the level at which it is desired to maintain the fuel and so that as the fluid rises it will overflow into said float chamber. The bottom of the float chamber is provided with an outlet 28 having a beveled mouth over which the flap valve 29 is mounted, whereby the fuel contained in said chamber may pass out through said outlet, but no fuel may enter through the outlet 28. Positioned in the float chamber there is a float 31 mounted on the lower end of the rod 32. The upper end of said rod is provided with a poppet valve head 33 which is tapered and adapted to seat in the tapered air inlet opening 34 in the top of the tank, whereby the valve will be opened when the float is elevated. For protecting the valve and limiting the upward movement of the float there is a cap 134 mounted on the top of the tank and enclosing said valve. An air vent or passage 35 is provided within said cap for permitting access to the atmosphere and preventing the loss of vapor, due to the positioning thereof, and there is also a similar air vent or passage 36 in the wall of the fuel chamber positioned near the top thereof for admitting air to the fuel discharge chamber 15 so the fluid will flow by gravity to the carburetor.

In operation the motor draws air from the vacuum chamber 18 through the pipe 23 past the valve 24. The chamber 18 being closed by the flap valve 21 and the valve 33, draws the fuel from the reservoir 13 through the fuel line 25 past the valve 26. After the fuel fills said vacuum chamber 18 sufficiently to cut off the suction and admit air thereto it passes from the lower end thereof into the fuel chamber 15 past the valve 21. The fluid rises in the vacuum chamber 18 until the fuel reaches the top of the float chamber 27. The fuel flows over into the float chamber and when it rises high enough it causes the float to rise and open the valve 33 and permit air to enter through the air vent 35. This relieves the vacuum created in the vacuum chamber and also permits the engine to continue to draw air through the vacuum chamber and no more fuel will be drawn in until the fuel level is lowered, the fuel in the fuel line 25 being maintained therein by the closing of the valve 26. As the fuel is used by the engine the level will be lowered, thus permitting the lowering of the float until the valve 33 closes and a vacuum is again created by the suction through the intake manifold. The valve 29 functions to permit the lowering of the fuel level in the float chamber with the fuel level of the vacuum chamber, and for draining the float chamber when the level of fuel falls below said valve.

In the modified form shown in Fig. 4 the float chamber is dispensed with and in place of the float 31 there is employed an inverted truncated cone-shaped float 37, and a guide 38 for the float stem 32. Because of the fact that an appreciably greater pressure must be brought to bear for opening the valve 33 than for maintaining it in open position, the level of the fuel in the fuel tank must rise to the point A with respect to said float for forcing said valve open. However, after said valve is forced open, it so remains and no more fuel is drawn into the tank until the level has reached the point B with respect to said float below which level said valve will be permitted to close. Therefore, the fuel will be maintained at all times at a level between approximately the lines A and B on the modified form and the top of the float chamber 27 at a point near the bottom thereof in Fig. 4.

In the form shown in Fig. 4 it is observed that the lower part of the float shown therein is smaller or of less width than portions of the float above it. The buoyancy of the float as it rises around the narrow lower part will not be sufficient to elevate the valve 33 and open it, because the suction acts on the valve 33 as well as gravity to keep it closed. But as soon as the fluid rises to the wider part of said floats, the buoyancy is so great as to overcome both the gravity and the suction and when it does so it is obvious that it gives a very sudden upward and opening movement of the valve 33, which is desirable in such devices. When the valve 33 is open, as shown in Fig. 3, the suction does not act on the valve to close it, there being no force of gravity to tend to close said valve, and it will not close until the float settles low enough in the float chamber so it will exert a minimum of buoyancy effect on the float.

The same result is attained, so far as the action of the float is concerned, in the modified form shown in Fig. 5, where two floats 40 and 41 are provided, rigidly connected by the rod 42 so that the smaller float 41 will be below the larger float 40. The same valve rod 32 is employed, and in fact so far as the operation is concerned, the rods 32 and 42 might be integral or the same rod, because they are in rigid relation to each other and may herein be so considered, and the two floats 40 and 41 are in rigid relation to each other and will operate the same as the single continuous float in Fig. 4. The float 42 is guided by the guide bar 138. When the fluid rises to or above the smaller float 41 but has not reached the larger float, the buoyancy will be insufficient to open the valve 33, but when the fluid rises to the larger float it will open the valve 33 and then when the float descends the valve will remain open until the fluid descends to the small float.

The invention claimed is:

A vacuum tank for controlling a supply of liquid fuel to carbureters for internal combustion engines, including a vacuum chamber with an air inlet opening in the top thereof, a float chamber in the vacuum chamber with the upper end open and with a valve closed opening at the lower end arranged to permit the outlet but prevent the inlet of fluid through said opening, a float in said float chamber, a valve for the air inlet opening, and a rigid connection between the float and valve, whereby the fluid will rise in the vacuum chamber to the top of the float chamber and overflow into said float chamber and elevate the float and open the valve.

In witness whereof, I have hereunto affixed my signature.

HENRY B. COATS.